(No Model.)
A. H. LAWFER.
NUT LOCK.
No. 593,107. Patented Nov. 2, 1897.
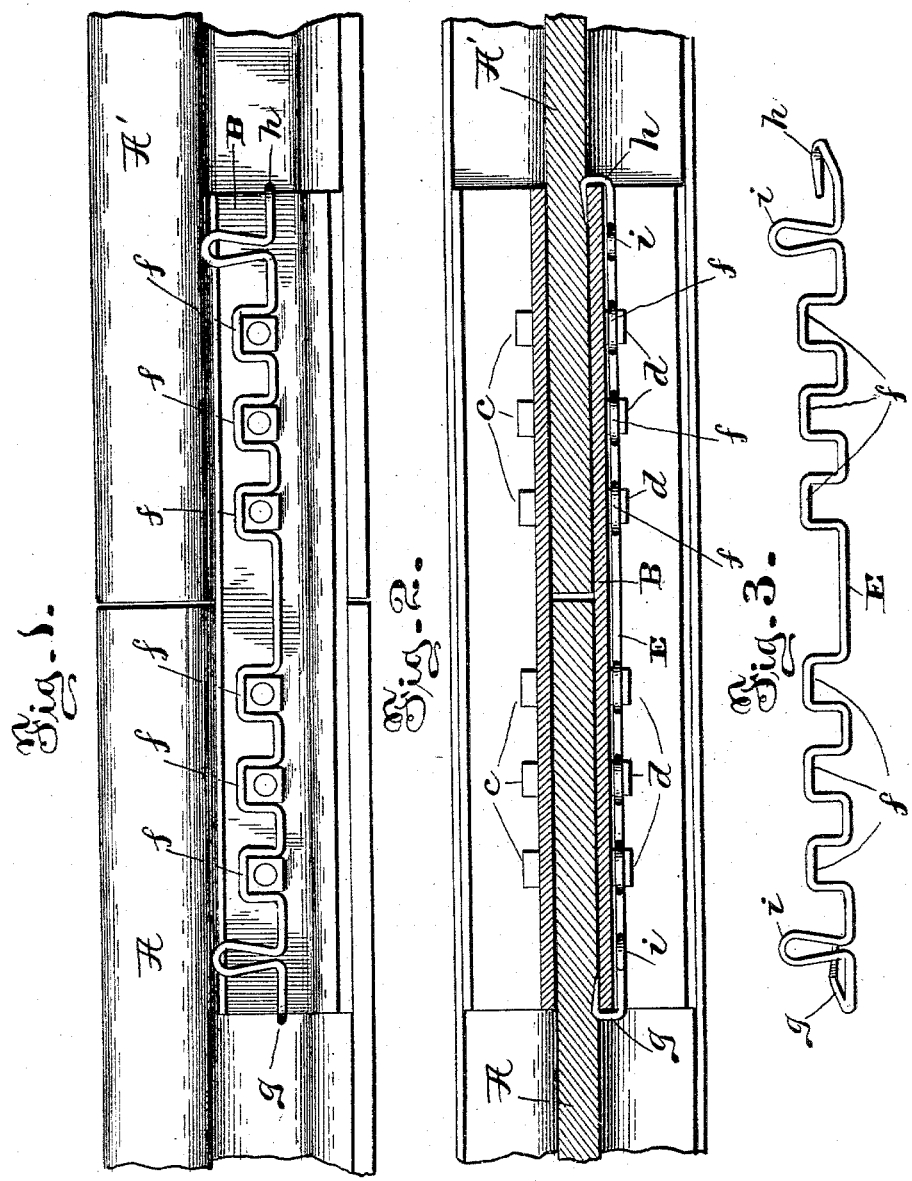
WITNESSES
Marcus L. Byng.
INVENTOR
Albert H. Lawfer
By John Wedderburn
Attorney

UNITED STATES PATENT OFFICE.

ALBERT H. LAWFER, OF DUNCANSVILLE, PENNSYLVANIA.

NUT-LOCK.

SPECIFICATION forming part of Letters Patent No. 593,107, dated November 2, 1897.

Application filed January 20, 1897. Serial No. 619,851. (No model.)

*To all whom it may concern:*

Be it known that I, ALBERT H. LAWFER, a citizen of the United States, residing at Duncansville, in the county of Blair and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to certain new and useful improvements in nut-locks, the object being to provide a simple and efficient nut-lock formed of spring-steel and adapted to engage all the nuts at the meeting ends of two adjoining rails and prevent said nuts from becoming detached from the bolts.

To this end my invention consists of a spring-steel bar or wire formed with a series of nut-engaging loops and with hook members adapted to engage the fish-plate and be confined between the same and the rail.

My invention also consists in certain novel constructions, combinations, and arrangements of parts, as will be hereinafter more fully described, and set forth in the appended claims.

In the accompanying drawings, Figure 1 is a side view of two adjoining rails and connecting fish-plate, showing my invention applied thereto. Fig. 2 is a sectional plan view of the same. Fig. 3 is a perspective view of the nut-lock bar or wire.

Referring to the drawings, the letters A A' designate the meeting ends of the two rails; B, the fish-plate; c, the bolts which confine said parts together, and d the nuts on the bolt ends.

The nut-lock device comprises a bar or wire E, constructed, preferably, of spring-steel, although it may be constructed of other suitable metals, if desired. This bar is bent to form a series of intermediate nut-receiving loops or three-sided openings f, in the present instance numbering six. One end of the bar is bent to form a laterally-projecting hook g, and the other end forms a similar hook h, and between one of the said hooks and its adjoining nut-receiving loop f is the vertically-arranged spring impinging piece i.

Fig. 1 of the drawings shows the nut-lock bar in operation. Here the nut-receiving loops f take about the nuts d, with the open side thereof at the bottom and the central connecting side extending across the nut at the top. The two end hooks g h extend around the ends of the fish-plate and are securely clamped between the same and the sides of the rails, while the spring impinging piece i impinges against the bottom of the rail-head, and thereby keeps the bar firmly pressed down upon the nuts. It will thus be seen that the hooks g h prevent lateral movement of the bar, while the impinging piece i prevents vertical movement thereof.

My invention provides a simple and cheap nut-lock bar which engages a plurality of nuts at a time and effectually prevents said nuts from working loose from the bolts.

Having thus described my invention, what I claim as new, and desire to secure by Letters Patent, is—

1. A nut-lock, comprising a bar or wire formed with a plurality of nut-receiving loops or openings, a laterally-projecting hook at each end, and a vertical impinging piece adjoining one of said hooks, substantially as described.

2. The combination with rails, fish-plates at the adjoining ends thereof, bolts connecting said rails and fish-plates and nuts on the ends of the bolts, of a nut-lock bar provided with a series of nut-receiving loops, the central sides of which hang upon said nuts, and having end hooks clamped between said fish-plates and rails, and a spring impinging piece adapted to impinge against the under side of the rail-head and thereby press the bar down against the nuts, substantially as described.

In testimony whereof I have signed this specification in the presence of two subscribing witnesses.

ALBERT H. LAWFER.

Witnesses:
S. B. GABLE,
L. M. BUCKEL.